E. M. Bard,
Plow,

Nº 10629. Patented Mar. 14, 1854.

UNITED STATES PATENT OFFICE.

EDWIN M. BARD, OF PHILADELPHIA, PENNSYLVANIA.

IMPROVEMENT IN MOLD-BOARDS OF PLOWS.

Specification forming part of Letters Patent No. 10,629, dated March 14, 1854.

*To all whom it may concern:*

Be it known that I, EDWIN MILFORD BARD, of the city and county of Philadelphia, and State of Pennsylvania, have invented a new and useful Improvement in Plows, which is described as follows, reference being had to the annexed drawings of the same, making part of this specification.

Figure 1:
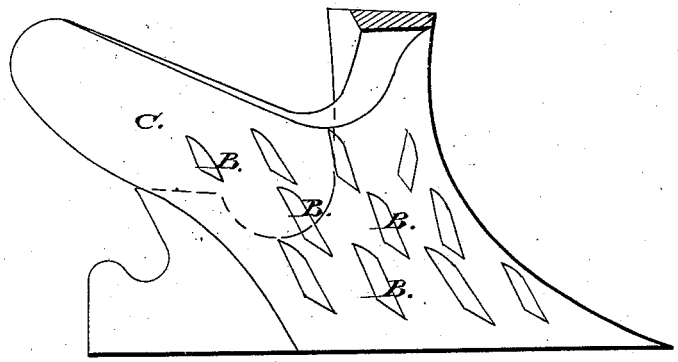
Figure 3:
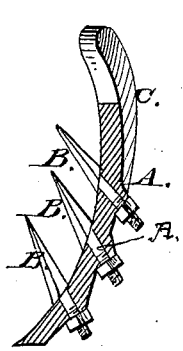
Figure 2:
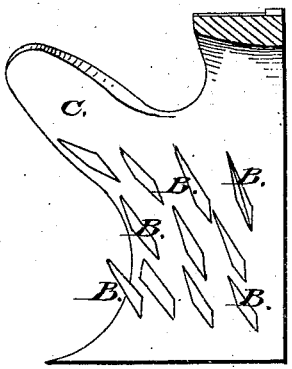
Figure 4:
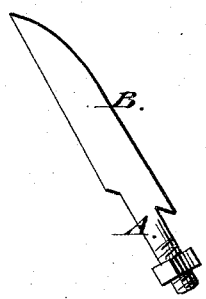

Figure 1 is a side elevation of the mold-board and landside detached from the other parts. Fig. 2 is a front view of the same. Fig. 3 is a diagonal section through the mold-board. Fig. 4 is a side view of one of the cutters or knives detached from the mold-board.

Similar letters in the figures refer to corresponding parts.

In the use of the ordinary plow with plain mold-board the body of earth thrown from each successive furrow is laid over in an almost compact mass upon the preceding one, leaving the ground, after being plowed, in almost solid rows of earth packed upon each other, and requiring the field to be deeply harrowed to reduce it to the proper state to receive the grain or esculent seed it is designed to receive.

Now, the object of my improvement is to break or pulverize the layers of earth at the same time that they are cut and thrown over by the mold-board, and cause the ground, when plowed, to be thoroughly softened the full depth, or nearly so, of the cut of the plow, and, in fact, enable the plow in its progress through the field to perform the two offices of plow and harrow. To accomplish this I simply make a number of holes in the mold-board and insert in the same the shanks A of a series of knives or cutters, B, held securely in their places by nuts screwed onto the shanks of the knives and against protuberances or lugs on the inner surface of the mold-board C. These knives may be made of either wrought-iron with steel edges or entirely of wrought-iron or steel, to suit the nature of the ground or the views of the constructer, and incline backward and outward from the mold-board, and are arranged in such relation to each other as to thoroughly cut and pulverize the earth thrown up by the mold-board as they pass through the same, and cause the field, after being plowed, to be pulverized or softened to the proper degree to adapt it to receive the grain or other article the same as if it had been thoroughly harrowed.

I do not claim to be the exclusive inventor of the combination of cutters or rakes with cultivators or plows for enabling the latter to perform two functions at the same time; but What I do claim is—

Securing the cutters in openings formed in the mold-board at the points and in the inclined positions outward and backward represented, so as to enable the lower forward cutters to cut and loosen the soil preparatory to it being overturned, and the other cutters to more thoroughly pulverize it as the body of earth is thrown over, and the cutters, from their peculiar inclined position, to disengage themselves from weeds and other obstacles as they pass the same, the several parts being precisely as described.

E. MILFORD BARD. [L. S.]

Witnesses:
W. H. SUPPLEE,
D. MERRITT.